United States Patent [19]
Kaminsky et al.
[11] 4,150,093
[45] Apr. 17, 1979

[54] METHOD FOR CONCENTRATING HEAVY MINERALS IN THE SOLIDS TAILINGS FROM HOT WATER EXTRACTION OF TAR SANDS

[75] Inventors: Victor Kaminsky; Lloyd W. Trevoy; Alvin Maskwa, all of Edmonton, Canada

[73] Assignees: Her Majesty the Queen in right of Canada, as represented by the Minister of Energy, Mines and Resources, Ottawa; Her Majesty the Queen in right of the Province of Alberta, Government of the Province of Alberta, Department of Energy and Natural Resources, Alberta Syncrude Equity, Edmonton; Ontario Energy Corporation; Imperial Oil Limited, both of Toronto; Canada-Cities Service, Ltd., Calgary; Gulf Oil Canada Limited, Toronto, all of Canada

[21] Appl. No.: 905,632

[22] Filed: May 15, 1978

Related U.S. Application Data

[62] Division of Ser. No. 774,382, Mar. 4, 1977.

[30] Foreign Application Priority Data

Mar. 30, 1976 [CA] Canada .................................. 249204

[51] Int. Cl.[2] ........................ C01G 23/00; C01G 25/00

[52] U.S. Cl. .......................................... 423/74; 423/1; 423/69; 423/80; 423/DIG. 16; 208/11 R; 208/11 LE

[58] Field of Search ......... 423/1, 69, 74, 80, DIG. 16; 208/11 R, 11 LE

[56] References Cited

U.S. PATENT DOCUMENTS

| | | | |
|---|---|---|---|
| 1,893,913 | 1/1933 | Saint-Jacques | 423/1 |
| 3,656,938 | 4/1972 | Fenzes | 208/11 LE |
| 3,990,885 | 11/1976 | Baillie et al. | 208/11 LE |
| 4,032,300 | 6/1977 | Parker et al. | 423/DIG. 16 |

*Primary Examiner*—Herbert T. Carter
*Attorney, Agent, or Firm*—Ernest Peter Johnson

[57] ABSTRACT

An oily mass of solids tailings is derived from flotation of bitumen during hot water extraction of bituminous sands, and subsequent separation of most of the bitumen from associated solids. This oily mass contains a high concentration of heavy minerals, in the order of 10% by weight titanium and 4% zirconium. The tailings are introduced into a hot reaction zone and contacted with oxygen while agitating the solids. The bitumen associated with the solids is burned, as is residual coke left from the combustion of the bitumen. The product particles are discrete, dry and clean. They can be slurried with water and passed through gravity concentrating means, such as a spiral, to produce a concentrate containing in the order of 18% titanium and 8% zirconium.

4 Claims, 2 Drawing Figures

METHOD FOR CONCENTRATING HEAVY MINERALS IN THE SOLIDS TAILINGS FROM HOT WATER EXTRACTION OF TAR SANDS

This is a division of application Ser. No. 774,382, filed on Mar. 4, 1977.

BACKGROUND OF THE INVENTION

This invention relates to treating a waste stream, namely the solids tailings derived from the froth treating step of the hot water extraction process for recovering bitumen from bituminous sands, to modify the stream to a form in which it is amenable to conventional wet gravity concentration for the recovery of the contained titanium and zirconium values.

In the known hot water process for recovering bitumen, bituminous sands are agitated with water and steam in a tumbler and the resultant slurry is passed into a primary flotation vessel. The largest part of the coarse sand settles out in this vessel while the major portion of the bitumen floats to form froth, which is collected by a launder. A middlings stream is withdrawn from the vessel at its midpoint and is passed into an aerated secondary flotation vessel. Here a second froth product is produced which, after settling to reduce its water and solids content, is combined with the primary froth. This combined froth stream commonly comprises 63% bitumen, 8% solids and 29% water. The combined froth is deaerated and then sent to a circuit to separate the solids and water from the bitumen. This may be done by diluting the stream with naphtha and subjecting the diluted stream to two stage centrifugation. In the first stage, the froth is treated in a scroll-type centrifugal separator to remove the coarse and/or denser solids. In the second stage, the scroll product is passed through a disc-type centrifugal separator to remove the fine solids and water from the bitumen.

It is a peculiarity of the extraction process that it concentrates the bituminous sands' heavy minerals in the froth from the primary and secondary flotation vessels. These heavy minerals largely remain with the coarse solids produced as tailings. The invention has been developed in conjunction with scroll tailings from a dilution centrifuging circuit, and will be discussed hereinbelow in connection with this particular stream. However, it will be appreciated that the bitumen froth can be treated to separate bitumen and solids using a system other than dilution centrifuging, for example by cycloning the dehydrated froth to produce a comparable oily mass of solids. Therefore the term "solids tailings" used in the claims below is intended to describe a solids stream derived from a process for removing solids from froth produced during hot water extraction of bituminous sands and containing most or all of the heavy mineral portion of the froth solids. The term "solids tailings" is not to be limited to scroll separator tailings.

The solids tailings, preferably scroll separator tailings, provide the preferred feed stock of the present invention. These tailings are a black oily mass of mineral particles permeated and held together by bitumen, naphtha and water. The hydrocarbon content of the tailings usually ranges from 4% to 8% by weight and the water content from 5% to 10% by weight. Analyses have further shown that approximately 65% to 70% of the scroll tailings consists of minerals of low density, having specific gravities of 3.0 or less. Major constituents of these light materials are silica sand ($SiO_2$), ferric oxide ($Fe_2O_3$), and ferrous carbonate ($FeCO_3$). The other minerals present have specific gravities ranging from about 3.0 to 4.6. Those at the lower end of this range (3.0 to 4.6) are iron aluminum silicates and other minerals of medium density. The remaining heavy minerals (ranging in specific gravity from about 4.0 to 4.6) contain the zirconium-based and titanium-based minerals that it is the purpose of the present invention to beneficiate. These heavy minerals include: Ilmenite ($TiO_2.FeO$), Leucoxene, a general term commonly used to describe the alteration product of minerals containing $TiO_2$ and FeO in various proportions, Rutile ($TiO_2$), and Zircon ($Zr\ SiO_4$).

SUMMARY OF THE INVENTION

We have found that the heavy minerals in the scroll tailings cannot be readily beneficiated in conventional wet concentrators due to the presence of the oil and high fines (−325 mesh) solids. A requirement of wet gravity concentration is that each particle must be free to act in response to its size and gravity. The oil tends to bind the particles together into agglomerates, so that they cannot separate in the spiral concentrator. Efforts to wash out the oil by use of naphtha diluents showed that excessive quantities were required. The use of water containing surfactant chemicals proved unsuccessful. It is therefore the purpose of this invention to provide a viable technique for removing the hydrocarbons and a significant proportion of the fine solids from the solids tailings so as to render them amendable to heavy minerals concentration and recovery.

In its broadest embodiment, the invention comprises heating and agitating the solids tailings in the presence of oxygen to burn off the bitumen coating. In this process, the bitumen cracks to lighter hydrocarbon components and lays down coke on the solid particles. Some or all of the cracked products and substantially all of the deposited coke are combusted to produce carbon-free solids which are then treated to concentrate the heavy mineral values associated therewith.

In a preferred embodiment, the invention comprises heating an oily mass of scroll tailings in a reactor to a temperature of about 800°-1400° F., preferably 1000°-1200° F., while agitating the material, to crack some of the bitumen and drive it off together with water as overhead product, and to burn off residual carbon in the presence of oxygen.

In a most preferred operation, the scroll tailings are treated in a two stage process. More particularly, the material is first heated in an oxygen-free atmosphere to crack the bitumen; oxygen is then introduced into the hot tailings while the solid particles are agitated to expose their coked surfaces. The oxygen reacts with the coke to form combustion products. Fine solids may be entrained in the gaseous overhead products from the two stages and are removed.

The tailings product from the reaction zone comprises minerals which are substantially free of hydrocarbons and coke and are relatively reduced in fine solids content. This product is mixed with water to form a slurry and is passed through mineral concentrator means, such as a spiral concentrator, to concentrate and recover the heavy minerals.

PREFERRED EMBODIMENT

Figure 1:
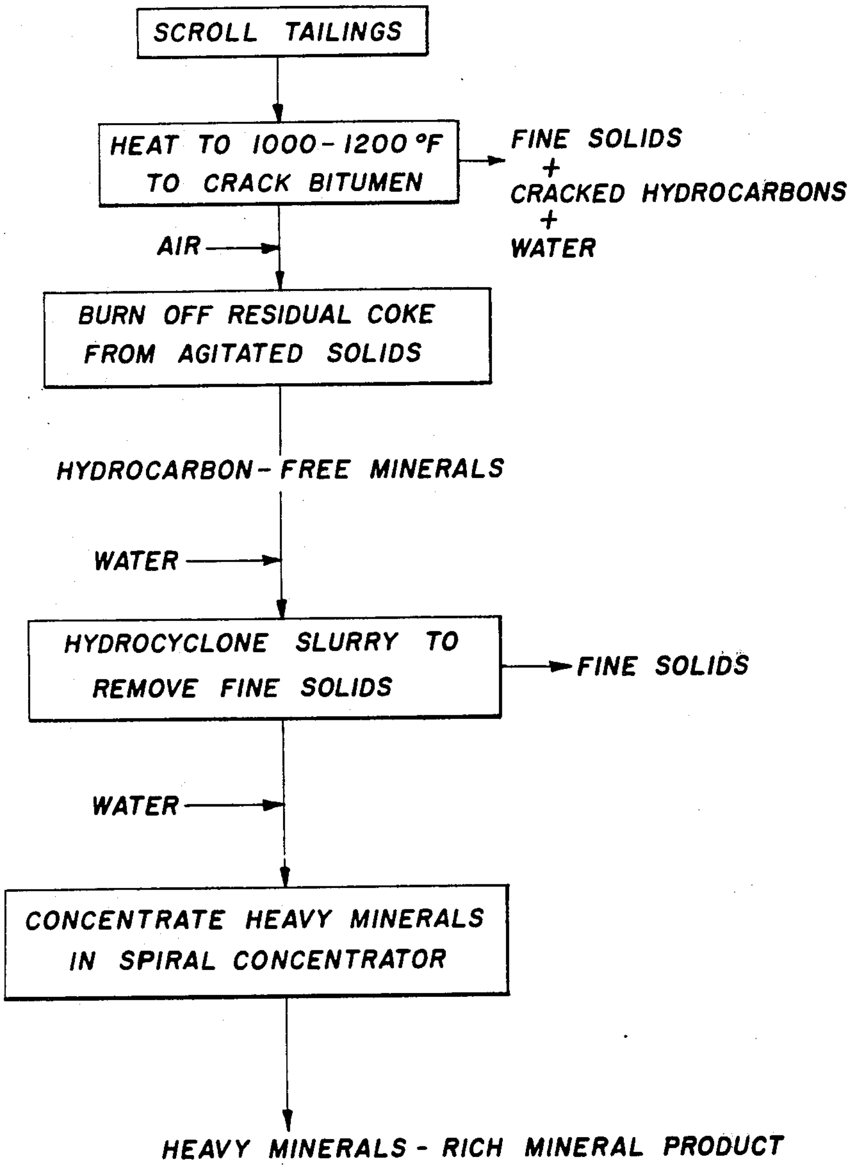
FIG. 1 is a block diagram showing the steps of the preferred embodiment of the invention.

The invention will now be described in accordance with the preferred embodiment outlined in the drawing. It is to be understood that the following description is exemplary and explanatory and is not restrictive of the invention, the scope of which is defined in the accompanying claims.

The scroll tailings to be treated are introduced into a fluid bed reactor and, under an inert atmosphere of nitrogen, are heated to 1025° F. or thereabouts. This treatment removes volatiles, including water, probably by a mechanism that includes (a) driving off light hydrocarbons, (b) driving off moisture, (c) "cracking" some bitumen to gaseous hydrocarbons that are then driven off under the influence of the nitrogen stream, (d) "cracking" some bitumen to liquid hydrocarbons that are volatile under the reaction conditions, and (e) converting some bitumen to coke that adheres strongly to the mineral particles. The hydrocarbons evolved from the tailings are recovered as overhead products.

The temperature to which the scroll tailings are heated is within the range 800°-1400° F. Below this range, cracking does not occur to the desired extent. At about 1400°-1500° F., sintering or clinkering of the particles begins to occur. Preferably the tailings should be heated to a temperature within the range 1000°-1200° F.

At the conclusion of this operation, heating is discontinued, the introduction of nitrogen is stopped, and air is introduced into the reactor. The air reacts with the coke to produce gaseous oxides of carbon. The rate of burn-off is controlled such that the temperature does not exceed 1400° F. Completion of the exothermic reaction is evidenced by a drop-off in temperature.

As described in the example, our coking and burn-off operations have been carried out in a fluid bed on a batch basis. Burn-off of the deposited coke requires intimate contact between the coke and oxygen — agitation of the particles, as by conducting combustion in a fluid bed operation, has been found necessary for complete removal of the coke. If subsequent concentrating steps involve high tension or magnetic separation processes, the presence of a coke layer on the solid surfaces could alter the electrostatic and magnetic properties of the particles and adversely affect separation. It is anticipated that a Herreshoff furnace, a multiple hearth furnace, or a rotary kiln may be used to treat the tailings continuously.

A useful discovery arising from the removal of bitumen by the batch fluidized bed procedure is that the final temperature attained in the burn-off stage is influenced by the level of moisture in the scroll tailings used as feed to the coking stage. Although it is desirable to dry the scroll tailings to some extent (this being done by placing the tailings in an oven set a few degrees above the boiling point of water) drying the tailings too thoroughly has an adverse effect on the combustion stage. For instance if the scroll tailings are dried to a water level as low as 0.5%, the final temperature reached in the burn-off step can be as high as 1400° F. This is undesirable since it allows the contents of the reactor to sinter together to produce agglomerates rendering the material undesirable for beneficiation. If on the other hand the moisture content of the feed is kept to an optimum of between 3.0% and 5.0%, the maximum temperature reached in the burn-off stage is about 1200° F. which, while being high enough to remove the coke from the mineral particles, avoids leading to an unacceptable level of sintering. The reason why the moisture content of the scroll tailings fed to the combustion stage should influence the final temperature in the burn-off stage is not known.

A second useful discovery, that arises from the use of the fluidized bed, is that the conditions of temperature, and of nitrogen and air flow, best suited to bitumen removal lead, at the same time, to a removal of about 15% of the lightest fines, these being blown out of the top of the reactor along with the carrier gas, volatile hydrocarbons, and water vapour. Since fines seriously reduce the efficiency of the concentrating process, a fines removal step is desirable. The removal of some of these light fines at the coking and burn-off stages is a further convenience of the fluid bed operation.

Following coking and burn-off, the reactor product is passed through a 20-mesh screen to remove clinkers. The undersize is then slurried with water and fed to one or more hydrocyclones to remove more of the fine solids. Following this, the water content of the hydrocyclone product is increased and the slurry is treated in a spiral-type concentrator to concentrate the heavy minerals and remove fine solids. Once concentrated in this manner, the product may be further refined as desired in accordance with known methods. For example, we have successfully used high tension and high intensity magnetic separation to further concentrate the spiral concentrator product.

The preferred process is illustrated in the following examples:

EXAMPLE I

This example demonstrates that the scroll tailings bitumen can successfully be burned off in a single stage operation, providing they are agitated. Scroll centrifuge tailings, were dried at 110° C., and passed through a hammer mill to break up lumps. The product was used as feed to a 1" diameter by 18" long fluid bed reactor. The scroll tailings analyzed 7.1% hydrocarbons, 2.9% water, and the remainder minerals. The weight of the charge was 625 g. Air was used to fluidize the reactor charge and the temperature of the reactor was raised slowly over a period of 3 hours to 870° F., during which time water and gaseous and liquid hydrocarbons and some fine solids passed overhead from the reactor. These liquids and solids were collected in a trap cooled in ice water. Heating was continued for a further 40 minutes as the temperature in the fluidized bed rose from 870° F., to 1460° F., at which point the reactor charge was allowed to cool while still being fluidized. The fine solids which passed overhead weighed 192 gm and the liquid hydrocarbons weighed 19 gm. The solids recovered from the reactor weighed 335 g. and were reddish-brown in color, due to the presence of ferric oxide. The reactor product was free of hydrocarbons and contained 10.5% titanium and 5.5% zirconium.

EXAMPLE II

This example describes a two-stage burn-off and demonstrates that heavy minerals in the burn-off product are amenable to concentration in a spiral.

11.35 Kg of the scroll tailings of Example I, previously dried to a water content of 5%, were disintegrated in a hammer mill and fed to an externally heated fluidized bed reactor having a diameter of 6 inches and bed depth of 3 feet. The tailings were heated to a maximum temperature of 1050° F. Nitrogen was passed through the heated mass from the bottom of the reactor so as to maintain the charge in a fluidized state. Thermocouples inserted at different heights in the reactor allowed the progress of the heating to be recorded. The maximum temperature was reached after 180 minutes.

The heaters were then switched off and air was admitted in place of nitrogen. The progress of the burn-off stage was followed by monitoring the temperature and by measuring the oxygen content of the gas emerging from the reactor. The burn-off step took about 180 minutes, during which the temperature rose to about 1200° F. and then began to fall, signifying the completion of the burn-off stage.

It was found that approximately 50% of the fines had been removed from the tailings as overhead product from the reactor. The tailings themselves were essentially hydrocarbon and coke free.

Figure 2:
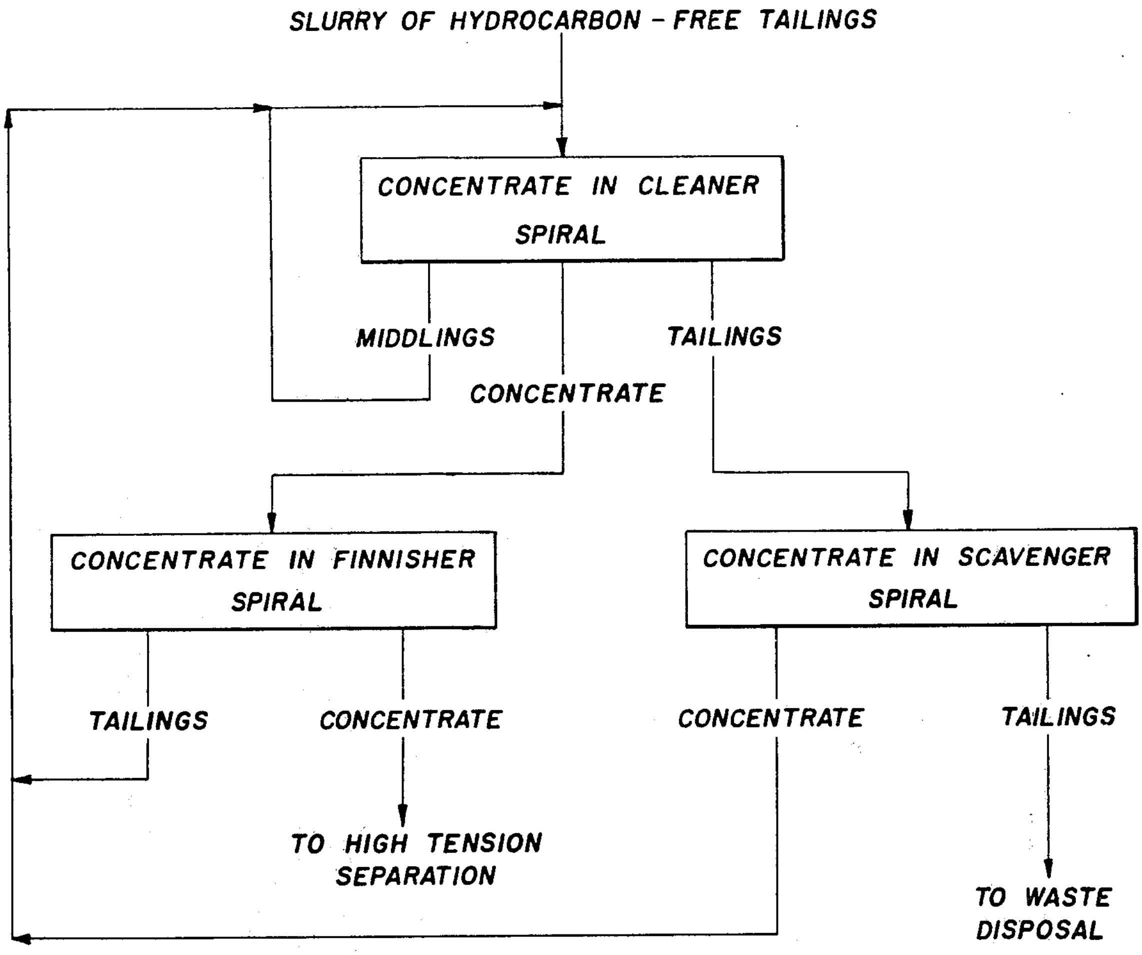
FIG. 2 is a block diagram showing the spiral arrangement used.

Describing the beneficiation of the dry mineral mixture to titanium-containing and zirconium-containing mineral concentrates will help to reveal the usefulness of the pretreatment described herein. The dry coke-free product was passed through a 20-mesh screen to remove the larger clinkered material. An aqueous slurry of the mixed minerals from the screening treatment was then prepared to contain about 25% of mineral solids, and the slurry was fed to a 3" diameter hydrocyclone. The overhead from the hydrocyclone was fed to a second similar hydrocyclone and the underflows from the two hydrocyclones were combined. The feed to the first hydrocyclone contained 19% fines and the product contained 6% fines. The combined underflows were then re-slurried with water to provide a spiral feed slurry containing 25% solids. This slurry was fed to a series of Humphreys spirals. To give good separation, a sequence of 5 turn spirals was used — a cleaner spiral producing cleaner concentrate, middlings, and tailings; a finisher spiral producing finisher concentrate and tailings; and a scavenger spiral producing scavenger concentrate and tailings. (The relationship of the streams to the spirals is shown representationally as part of FIG. 2.) The product of the spiralling process was the concentrate from the finisher spiral, while the tailings from the scavenger spiral was disposed of.

Tailings prepared as above were accumulated and 170.8 Kg of fresh feed and 91.6 Kg of recycle material (see FIG. 2) were run through the circuit and produced 45.1 Kg of concentrate from the finisher spiral. After drying, the weight of concentrate was 43.1 Kg. The various adjustments necessary to run the spirals in this particular case were set as follows:

| | Cleaner Spiral | Finisher Spiral | Scavenger Spiral |
|---|---|---|---|
| | 5 turns | 3 turns | 5 turns |
| Line Pressure (lb) | 15 | 10.5 | 10.0 |
| Pulp Density % | 25 | 25 | 25 |
| Pumping Rate (gal/min) | 20 | 15 | 15 |
| Concentrate Ports Open | 3,6,9,12 (set at 8) | 3,5,6,7,9 (set at 8) | 3,5,7,9,11,15 (set at 8) |
| Middlings Ports Open | 14,15 (set at 8) | — | — |
| Wash Water (ex hydrocyclone) (gal/min) | 6 | 6 | 5 to 6 |

Concentrate from the finisher spirals was dried and then fed to a laboratory-scale high-tension separator where, by suitable setting of the voltage, rate of feed, rate of recycle splitting of product streams etc., 3 minerals fractions were obtained—one rich in titanium minerals, another rich in zirconium minerals and a third being a middlings stream suitable for recycle through the separator. In the separator machine the following settings gave satisfactory results:

Feed Rate 2000 g/min
Feed hopper temperature 190° C.
Rotor speed 200 r.p.m.
Voltage 35 Kv
Polarity-charging electrode—negative 3000g of (dried) concentrate from the Humphreys spiral circuit described above gave:
- 853.3g separated concentrate in right hand receiver (mostly titanium minerals).
- 624.0g separated concentrate in the central receiver (middlings intended for recycle).
- 1509.7g separated concentrate in the left hand receiver (zirconium and other minerals).

Taken as a whole the beneficiation of heavy minerals entering the process as a constituent of scroll tailings allows the concentration to titanium and zirconium to be increased approximately as follows.

| | |
|---|---|
| Scroll tailings: | 10% titanium<br>4% zirconium |
| Humphreys spiral: concentrate | 18 to 20% titanium<br>8% zirconium |
| High tension separator titanium-containing concentrate: | usually 35 to 40% titanium depending on the ratio of $TiO_2$ to oxides of iron in the minerals present. |

The embodiments of the invention in which an exclusive property or privilege is claimed are defined as follows:

1. A process for beneficiating hot water process froth treatment solids tailings containing bitumen, fine solids and titanium and zirconium minerals, which comprises:
introducing the tailings into a reaction zone containing an inert atmosphere;
heating the tailings to crack some of the bitumen and drive off gaseous hydrocarbons and water while simultaneously converting the balance of the hydrocarbons to coke;
contacting the hot tailings with oxygen, while agitating the tailings, to burn the bitumen and coke produced therefrom and to remove some of the fine solids by entraining them in the off gases, whereby tailings substantially free of hydrocarbons and coke and reduced in fines content are produced;
mixing the product tailings with water to produce a slurry; and
passing the slurry through a spiral concentrator to concentrate the titanium and zirconium minerals.

2. The process as set forth in claim 1, wherein:
the heating and burning steps are carried out in a fluid bed reactor.

3. The process as set forth in claim 1, wherein:
the water content of the tailings immediately before the introducing step is at least 3% by weight of the tailings.

4. The process as set forth in claim 1, wherein:
the tailings are scroll centrifugal separator tailings.

* * * * *